C. A. PUTNAM.
BAND SAW WHEEL.
APPLICATION FILED JUNE 8, 1908.
942,588.
Patented Dec. 7, 1909.
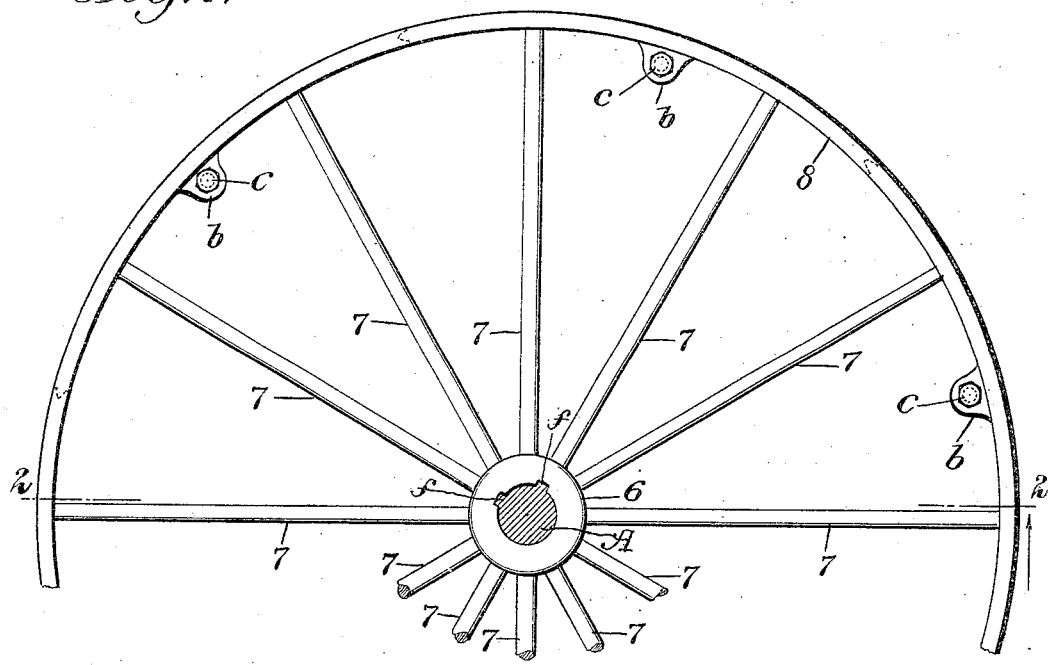
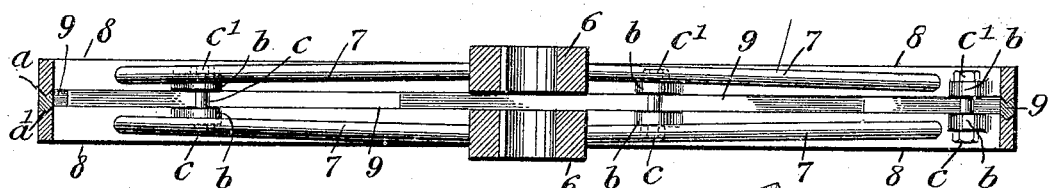
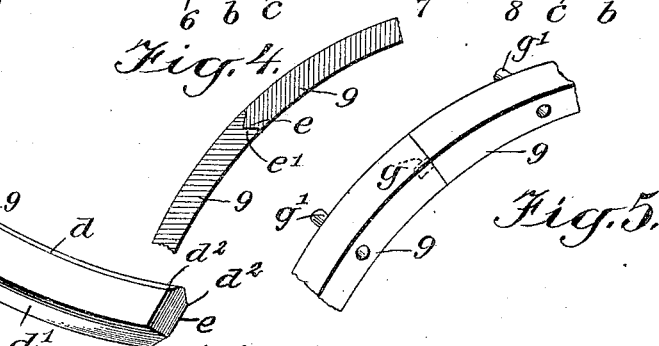
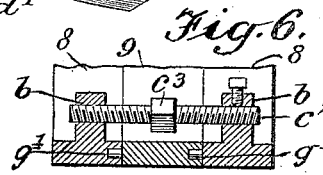
WITNESSES
INVENTOR
Charles A. Putnam
BY
Munn & Co.
ATTORNEYS

UNITED STATES PATENT OFFICE.

CHARLES AURELIUS PUTNAM, OF TUPPER LAKE, NEW YORK.

BAND-SAW WHEEL.

942,588.　　　　　Specification of Letters Patent.　　　Patented Dec. 7, 1909.

Application filed June 8, 1908. Serial No. 437,293.

*To all whom it may concern:*

Be it known that I, CHARLES AURELIUS PUTNAM, a citizen of the United States, and a resident of Tupper Lake, in the county of Franklin and State of New York, have invented a new and Improved Band-Saw Wheel, of which the following is a full, clear, and exact description.

This invention relates to supporting wheels for endless band saws, and has for its object to provide novel details of construction for a band saw wheel, whereby the width of the faces of a pair of band saw wheels may be decreased, to compensate for the decrease in width of the band saw, due to the successive cutting away of the saw blade in sharpening the teeth thereof, the saw teeth being thus projected beyond the sides of the wheels, and the band or body of the saw adapted for a close contact with the faces of the wheels, that is essential for the rotatable movement of the saw blade without slipping while in operation.

The invention consists in the novel construction and combination of parts, as is hereinafter described and defined in the appended claim.

Reference is to be had to the accompanying drawings forming a part of this specification, in which similar characters of reference indicate corresponding parts in all the views.

Figure 1 is a side view of a main portion of a band wheel embodying features of the invention; Fig. 2 is a transverse sectional view thereof, taken through the center of the wheel, substantially on the line 2—2 in Fig. 1; Fig. 3 is an enlarged perspective view of a segment of the wheel rim, that embodies features of the invention; Fig. 4 is a longitudinal sectional view of portions of two rim sections of the improved band wheel, showing one means for joining the ends of said section together; Fig. 5 is a perspective view of two portions of a wheel rim of a band wheel, showing the ends thereof doweled together where they impinge upon each other; and Fig. 6 is an enlarged transverse sectional view of a portion of the improved wheel rim, and a preferred means for connecting the rim sections together.

Each of the band wheels employed for the rotatable support of an endless band saw, comprises the following details: The two similar hub sections 6, 6 each have a plurality of arms 7 projected radially therefrom at equal distances apart, said arms having an equal length. Upon each set of arms 7 a circular rim 8 is mounted and secured, said circular rims being thus disposed concentric with the axis of the respective hub sections 6, and in service each constitutes a section of the complete wheel rim. The hub sections 6, 6 are preferably secured on a shaft A by keys $f$, and engage key seats in the hub sections, the latter being secured together by means that will be described.

The inner edges of the rim sections 8 are preferably adapted for an interlocking engagement with each other, by giving the side edge of one rim section a V-shaped tongue $a$, and the opposite edge of the other rim section a V-shaped channel $a'$.

Upon the inner surfaces of the wheel rim sections 8, and at preferably equal distances apart, ears $b$ are formed, that are disposed opposite each other in pairs, each pair of ears projecting inwardly and having alined perforations therein for the insertion of bolts $c$, which project at one end for the reception of nuts $c'$. Preferably the pairs of ears $b$ are threaded in their perforations, right and left-handed, respectively, and as shown in Fig. 6, a bolt $c^2$ having a squared formation $c^3$, at its center, is provided to connect each pair of ears, the end portions of the bolt having threads thereon which engage with the threads in the ears, so that if the bolt is turned in a proper direction it will draw the ears toward each other. The rim sections 8 may also be secured together by the embedment of the tongue $a$ in the channel $a'$, and a clamping adjustment of the nuts on the bolts $c$ after the latter are inserted into the opposite pairs of ears $b$, and it will be understood that the sectional wheel rims 8 when thus connected together, will present a smooth flat peripheral surface, having a width that is the minimum breadth of the band wheel.

The essential feature of my invention consists in the provision of filling sections 9 having a suitable width, and adapted for an insertion and clamped retention in place between the opposed edges of the rim sections 8, 8.

As shown in Fig. 3, each filling section 9 consists of a curved strip of wood or metal having a suitable length, and such an arched curvature as adapts it to exactly conform with that of the wheel rim sections 8. Upon the opposite side edges of the filling sections 9 that are of an equal width, V-shaped tongues and grooves or channels are formed as shown at $d$, $d'$ in Fig. 3, which will respectively fit into the channels $a'$ and receive the tongues $a$ on the edges of the wheel rim sections 8, 8, when the filling sections 9 are introduced between said rim sections. A proper length and number is had by the filling sections 9 to adapt them for forming a complete rim section when assembled into ring form, and as additional means for securing the filling sections 9 in place, their meeting ends are formed either with V-shaped tongues and channels as shown at $e$, $e'$ in Fig. 4, or are provided with dowel pin and socket connections as represented at $g$ in Fig. 5. Other dowel pins $g'$ may be projected from the rim sections 8 on their inner sides and engage transverse sockets in the filling sections 9, which will dispense with the tongues $d$ and grooves $d'$ in the rim sections and filling sections.

The filling sections 9 are normally combined with the wheel rim sections 8, 8, and may represent the maximum width of the wheel rim in completed condition, the rim sections 8 being secured together by means of bolts and nuts $c$, $c'$ that engage the ears $b$ as hereinbefore mentioned, and as shown in Fig. 2.

Slight offset shoulders $d^2$ are formed at the sides of the tongues $d$, which facilitate grinding the face of the wheel rim, and if there are any slight inequalities on the peripheral surface of the completed band wheel rim, these can be removed by grinding or other means, and the band wheel thus adapted for use in pairs as supports for a band saw of a maximum width, that will permit the teeth of the saw to extend laterally from the edges of the band wheel rims.

It is to be understood that any preferred number of complete filling rings that vary in width may be provided, so that the width of the band wheel rims may be exactly reduced to conform with that of the band saw; and obviously, when a new saw of greater width is to be mounted for service the width of the band wheel rims may be proportionately increased by substituting a filling ring of a proper width, and securing it in place.

Having thus described my invention, I claim as new and desire to secure by Letters Patent:

The combination with two band wheel rim sections, having opposed V-shaped tongue and channel formations on their mating edges, and spaced laterally perforated ears depending from the rim sections, of a filling ring formed of a plurality of sections having interlocked connections at their ends, and having their edges channeled and tongued to respectively engage with the tongue and channel formations on the edges of the band wheel rim sections, and bolts and nuts engaging the perforated ears for clamping the rim sections upon the sectional filling ring.

In testimony whereof I have signed my name to this specification in the presence of two subscribing witnesses.

CHARLES AURELIUS PUTNAM.

Witnesses:
   GEORGE E. BRISTOL,
   JEREMIS SCRIPTURE.